United States Patent
Zhi et al.

(10) Patent No.: US 11,942,598 B2
(45) Date of Patent: Mar. 26, 2024

(54) IONIC LIQUID SOFTENED POLYMER ELECTROLYTE FOR ZINC ION BATTERIES

(71) Applicant: Hong Kong Centre for Cerebro-cardiovascular Health Engineering Limited, Hong Kong (HK)

(72) Inventors: Chunyi Zhi, Hong Kong (HK); Donghong Wang, Hong Kong (HK)

(*) Notice: Subject to any disclaimer, the term of this patent is extended or adjusted under 35 U.S.C. 154(b) by 124 days.

(21) Appl. No.: 17/457,531

(22) Filed: Dec. 3, 2021

(65) Prior Publication Data
US 2023/0178800 A1    Jun. 8, 2023

(51) Int. Cl.
| | |
|---|---|
| *H01M 10/0565* | (2010.01) |
| *H01M 4/02* | (2006.01) |
| *H01M 4/24* | (2006.01) |
| *H01M 4/42* | (2006.01) |
| *H01M 4/66* | (2006.01) |
| *H01M 10/052* | (2010.01) |

(52) U.S. Cl.
CPC ....... *H01M 10/0565* (2013.01); *H01M 4/244* (2013.01); *H01M 4/42* (2013.01); *H01M 4/663* (2013.01); *H01M 10/052* (2013.01); *H01M 2004/021* (2013.01)

(58) Field of Classification Search
CPC .............................................. H01M 10/0565
See application file for complete search history.

(56) References Cited

U.S. PATENT DOCUMENTS

| | | | | |
|---|---|---|---|---|
| 2008/0292969 | A1* | 11/2008 | Mori | ............... H01M 4/622 |
| | | | | 429/303 |
| 2015/0244025 | A1 | 8/2015 | Rhee et al. | |
| 2020/0373628 | A1* | 11/2020 | Shi | ............... H01M 10/0565 |

FOREIGN PATENT DOCUMENTS

CN    1640931 A    7/2005

OTHER PUBLICATIONS

Liu et al., "Ionic Liquid-Incorporated Zn-Ion Conducting Polymer Electrolyte Membranes"; Polymers, 12, 1755, pp. 1-12, Aug. 6, 2020.
Wei et al., "Improving the Conductivity of Solid Polymer Electrolyte by Grain Reforming"; Nanoscale Research Letters, 15: 122, pp. 1-8 (2020).
Cheng et al., "Synthesis and electrochemical characterization of PEO-based polymer electrolytes with room temperature ionic liquids"; Electrochimica Acta 52, pp. 5789-5794 (2007).
Polu et al., "Ionic liquid doped PEO-based solid polymer electrolytes for lithium-ion polymer batteries"; International Journal of Hydrogen Energy 42, pp. 7212-7219 (2017).

* cited by examiner

*Primary Examiner* — Stephan J Essex
(74) *Attorney, Agent, or Firm* — NCC-IP (Nevin Carmichael Consulting); Nevin Carmichael

(57) ABSTRACT

A polymer electrolyte includes a polyethylene oxide matrix, a plasticizer additive, a solute, and a filler. The plasticizer additive includes an ionic liquid and the filler includes zinc oxide. An energy storage device includes an anode, a cathode and the polymer electrolyte. An energy storage device includes a zinc anode, a cathode and a polymer electrolyte, in which the polymer electrolyte includes a polyethylene oxide matrix and a plasticizer additive that includes an ionic liquid.

20 Claims, No Drawings

IONIC LIQUID SOFTENED POLYMER ELECTROLYTE FOR ZINC ION BATTERIES

FIELD OF THE INVENTION

The present invention relates to a polymer electrolyte based on polyethylene oxide for use in energy storage devices.

BACKGROUND OF THE INVENTION

Zinc ion batteries (ZIBs) are being intensively investigated as environmentally friendly and safe energy storage systems, which includes both aqueous and non-aqueous systems. With the aim of further application in wearable electronics, various kinds of flexible ZIBs have been investigated. The most commonly used electrolyte for flexible ZIBs are hydrogels filled with aqueous electrolytes. Although the high flexibility and stretchability offered by hydrogels, the issues of limited working voltage and water loss still limit possible applications ZIBs. Further issues are the formation of zinc dendrites as well as hydrogen evolution due to the presence of water in aqueous hydrogel electrolytes. In addition, some cathode materials face dissolution problems in an aqueous environment. For example, manganese dioxide may be dissolved during discharge, which contributes to the fast degradation of battery performance. Therefore, $Mn^{2+}$ salts are usually added to compensate for that effect.

Recently, some progress has been made in case of lithium batteries where solid polymer electrolytes were found to be particularly useful. Specifically, a solid electrolyte matrix based on polyethylene oxide (PEO, sometimes also referred to as polyethylene glycol or PEG) was proved to be an efficient separator prohibiting the intrusion of lithium dendrites. Additionally, the solid electrolyte was useful to address safety issues caused by leakage and flammability of other organic electrolytes. Furthermore, the presence of oxygen in the PEO chains can enhance the dissolution of metal salts and the dissociation of metal ions due to their strong binding affinity with metal ions. However, solid PEO-based electrolytes suffer from low ionic conductivity at room temperature and brittleness. In case of solid state lithium batteries, many efforts have been made in order to improve the conductivity and softness of the PEO based electrolyte. One method involves breaking crystalline areas of the PEO matrix e.g., by use of plasticizers. However, the strength of the electrolyte is reduced under these conditions. It is difficult to control the balance of ionic conductivity and mechanical strength of the resultant polymer electrolyte.

For example, Cheng et al. (Electrochim. Acta 2007, 52, 5789-5794) reported on new gel polymer electrolytes containing 1-butyl-4-methylpyridinium bis(trifluoromethanesulfonyl)imide ([Bmpy]TFSI) which were prepared by solution casting. The addition of [Bmpy]TFSI to a P(EO)$_{20}$LiTFSI electrolyte resulted in an increase of the ionic conductivity. The electrochemical stability and interfacial stability for these gel polymer electrolytes were also significantly improved due to the incorporation of [Bmpy]TFSI.

In US 2015/0244025 A1, a solid polymer electrolyte composition is disclosed which includes a polymer matrix, an organic solvent, and an additive agent containing polyhedral silsesquioxane. It further discloses a lithium secondary battery including the forgoing components.

Similarly, Polu et al. (Int. J. Hydrog. Energy 2017, 42, 7212-7219) reported on the influence of adding 1-ethyl-3-methylimidazolium bis(trifluoromethylsulfonyl)imide ([Emim]TFSI) to PEO-LiDFOB solid polymer electrolyte and the use of these electrolytes in solid-state Li/LiFePGO4 batteries.

Wei et al. (Nanoscale Res. Lett. 2020, 15:122) applied a simple and effective press-rolling method for reducing the crystallinity of PEO-based solid polymer electrolytes. With the rolled PEO-based solid polymer electrolyte, the LiFePG$_4$/solid polymer electrolyte/Li battery delivers an improved rechargeable specific capacity with a much lower capacity decay rate.

In case of ZIBs, no such improvements were made until now. In particular, no solid-state PEO electrolytes for use at room temperature have been developed.

For example, Liu et al. (Polymers 2020, 12:1755) reported on ionic liquid-containing Zn-ion conducting polymer electrolyte membranes based PVDF-HFP using [Emin]OTF as the ionic liquid.

A polymer electrolyte based on PEO and containing both, ionic liquid and a filler is disclosed in CN 1640931 (A). However, the focus of this patent application is on dye sensitized nanometer crystal films or solar cells.

In view of the foregoing, there is still a need for electrolytes useful for energy storage devices, in particular zinc ion batteries (ZIBs), which overcome the above disadvantages.

SUMMARY OF THE INVENTION

Accordingly, one object of the present invention can be seen in the provision of an electrolyte for a ZIB with good or improved mechanical properties, such as yield stress, Young's modulus, and softness, in particular at room temperature. Still another object of the present invention can be seen in the provision of an electrolyte for a ZIB with good or improved melting characteristics, such as glass transition temperature and melting temperature. Still another object of the present invention can be seen in the provision of a solid electrolyte for ZIBs which has good or improved anti-drying behaviour. Still another object of the present invention can be seen in the provision of an electrolyte for ZIBs which has good or improved ionic conductivity and/or ionic resistance.

Accordingly, it is another object of the present invention to provide a corresponding energy storage device, in particular a zinc ion battery (ZIB), which takes advantage of the improvements of the electrolyte of the present invention. Therefore, still another object of the present invention can be seen in the provision of an energy storage device, in particular a zinc ion battery (ZIB), which allows for a (more) stable and constant operation at room temperature. In particular, it is desirable that the energy storage device is less susceptible to disruptions associated with dendrite formation, and less prone to leakage than conventional systems. Also, another object can be seen in the provision of a (more) environmentally friendly energy storage device, in particular when compared to conventional lithium-based systems.

One or more of the foregoing objects and other objects are solved by the invention defined herein in the independent claims.

A first aspect of the present invention relates to a polymer electrolyte comprising a polyethylene oxide matrix, a plasticizer additive, a solute, and a filler, characterized in that the plasticizer additive comprises an ionic liquid and the filler comprises zinc oxide.

By the addition of plasticizer to a PEO matrix, high conductivity and soft interfacial contact of the resulting solid polymer electrolyte could be achieved at room temperature. The addition of zinc oxide filler was also found to be beneficial. The PEO-based composite electrolyte not only provided high conductivity, but also enhanced flexibility along with improved mechanical properties compared to conventional hydrogels (e.g., PAA, PVA, PAM). The PEO composite electrolyte was applied as both the quasi-solid electrolyte and separator for a flexible $Zn/MnG_2$ battery. The intimate contact between the soft separator and the electrodes allows for a stable energy output under different bending states. Furthermore, the PEO composite electrolyte provides anti-drying/no-leakage, which makes the designed Zn/PEO composite/$MnG_2$ battery work well at room temperature without capacity decay for up to 100 hours.

Another aspect of the present invention relates to an energy storage device comprising an anode, a cathode, and the polymer electrolyte according to the present invention described above.

Still another aspect of the present invention relates to an energy storage device comprising a zinc anode, a cathode, and a polymer electrolyte, characterized in that the polymer electrolyte comprises a polyethylene oxide matrix and a plasticizer additive comprising an ionic liquid

DETAILED DESCRIPTION OF THE PREFERRED EMBODIMENTS

The following terms used throughout the present specification shall have the meanings set forth hereinafter: The term "matrix" as used in connection with the polymer of the electrolyte indicates that said polymer is the shaping component. A "solute" as used herein is a component which comprises metal ions, i.e. in the form of a metal salt, which is used to provide or enhance conductivity as part of a mixture or composite, e.g. within the electrolyte. The term "ionic liquid" as used herein refers to a salt in the liquid state. Unless indicated otherwise, this term is restricted to salts whose melting point is below 100° C.

Where an indefinite or definite article is used when referring to a singular noun, e.g., "a", "an" or "the", this shall include a plural of that noun unless anything else is specifically stated. Where the term "comprising" is used herein, it does not exclude other elements. In turn, the term "consisting of" is considered to be a preferred embodiment of the term "comprising" and shall mean that no further features are present in the corresponding embodiment apart from the ones following said wording. Terms like "obtainable" or "definable" and "obtained" or "defined" are used interchangeably. This, for example, means that, unless the context clearly dictates otherwise, the term "obtained" does not mean to indicate that, for example, an embodiment must be obtained by, for example, the sequence of steps following the term "obtained" though such a limited understanding is always included by the terms "obtained" or "defined" as a preferred embodiment. Whenever the terms "including" or "having" are used, these terms are meant to be equivalent to "comprising" as defined hereinabove.

Advantageous embodiments of the electrolyte of the present invention and of the further aspects are defined in the dependent claims and will be explained in the following.

The cation of the organic liquid may be a relatively large organic cation. According to one embodiment, the cation of the ionic liquid is selected from the group consisting of imidazolium, vinylimidazolium, pyridinium, pyrrolidinium, guanidinium, piperidinium, morpholinium, ammonium, phosphonium and combinations thereof.

The anion of the ionic liquid may be independently selected from the group consisting of halogenides, perchlorate, tetrafluoroborate, trifluoroacetate, hexafluorophosphate, phosphinates, tosylate, triflate, bis(trifluoromethanesulfonyl)amide, bis(fluorosulfonyl)-imide, bis(trifluoromethane)sulfonimide (TFSI), dicyanamide, tris(pentafluoroethyl)tri-fluorophosphate, dimethylsulfate, difluoro(oxalato)borate (DFOB), bis(oxalate)borate (BOB), trifluoromethanesulfonate (OTF) and combinations thereof.

According to a preferred embodiment, the ionic liquid comprises a pyrrolidinium cation or an imidazolium cation, preferably selected from the group consisting of 1-ethyl-3-methylimidazolium (Emim), 1-butyl-3-methylimidazolium (Bmim), 1-hexyl-3-methylimidazolium (Hmim) and combinations thereof. These cations have the following structure:

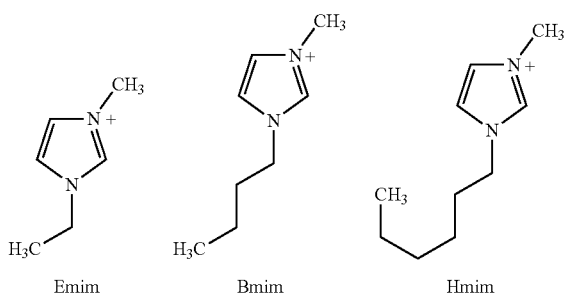

Emim　　　　Bmim　　　　Hmim

According to another preferred embodiment, the ionic liquid comprises an anion selected from trifluoromethanesulfonate (OTF) or bis(trifluoromethane)sulfonimide (TFSI). These anions have the following structure:

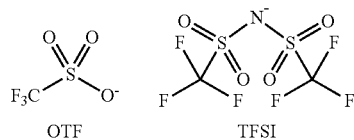

OTF　　　　TFSI

Therefore, according to a particularly preferred embodiment, the ionic liquid comprises a cation selected from Emim, Bmim and Hmim combined with an anion selected from OTF and TFSI, more preferably the ionic liquid is [Emim]OTF, [Bmim]OTF, [Hmim]OTF, [Emim]TFSI, [Bmim]TFSI or [Hmim]TFSI, still more preferably the ionic liquid is [Emim]OTF or [Emim]TFSI, and most preferably the ionic liquid is [Emim]OTF.

It has further been found that it may be beneficial if the plasticizer, i.e. the ionic liquid described hereinabove, is present at a specific ratio relative to the material of the electrolyte matrix, i.e. polyethylene oxide (PEO). Therefore, according to another embodiment, the weight ratio of plasticizer additive to polyethylene oxide (P/PEO) ranges from 0.01 to 2, more preferably 0.05 to 1.5, and most preferably from 0.8 to 1.3. It is believed that the ionic liquid facilitates the transformation of crystalline regions within the PEO matrix to become semicrystalline or even amorphous.

It has also been found that the addition of filler may be beneficial. In the context of the present invention, zinc oxide has been found to be particularly useful. In one embodiment, the filler useful according to the present invention is a zinc oxide nanofiller, i.e. the zinc oxide particles of the filler have a particle size in the nanometer range according to ISO/TS 27687:2008. According to another embodiment, the filler particles may have a specific shape. For example, the filler comprises zinc oxide nanotubes, zinc oxide nanorods, zinc oxide nanowires, zinc oxide nanoplates and/or zinc oxide nanoparticles. In a particularly preferred embodiment, the filler comprises zinc oxide nanorods.

A specific weight ratio of filler relative to the matrix polymer (PEO) may also be beneficial in term of mechanical properties of the electrolyte. Like the ionic liquid, the zinc oxide filler facilitates the transformation of crystalline regions within the PEO matrix to become semicrystalline or even amorphous. For example, in one embodiment, the weight ratio of filler to polyethylene oxide (F/PEO) ranges from 0.01 to 0.2, more preferably 0.02 to 0.15, and most preferably from 0.04 to 0.1.

The electrolyte further comprises a solute. In general, the nature of the solute is less critical, but it is beneficial if the solute is readily soluble in the polymer electrolyte matrix. Therefore, highly soluble metal salts are preferred. Thus, in the context of the present invention, the solute of choice is a highly soluble zinc salt. Also, it may be beneficial if the anion of the solute corresponds to that of the ionic liquid. Therefore, according to one embodiment, the solute is a zinc salt, more preferably the solute is zinc trifluoromethane-sulfonate (=Zn(OTF)$_2$) or zinc bis(trifluoromethane)sulfonimide (=Zn(TFSI)$_2$).

A specific concentration of the solute may also be beneficial, in particular with regard to the conductivity of the PEO-based polymer electrolyte. Therefore, according to another embodiment, the weight ratio of solute to polyethylene oxide (S/PEO) ranges from 0.05 to 0.4, more preferably 0.08 to 0.3, and most preferably from 0.1 to 0.15.

According to a particularly preferred embodiment, the ionic liquid is [Emim]OTF or [Emim]TFSI, wherein the filler comprises zinc oxide nanorods, and wherein the polymer electrolyte further comprises zinc trifluoromethane-sulfonate or zinc bis(trifluoromethane)-sulfonimide as a solute.

In any of the foregoing embodiments, the ratio P/PEO and/or the ratio F/PEO and/or the ratio S/PEO may be within the ranges defined above. Most preferably, the ratio P/PEO ranges from 0.8 to 1.3 and/or the ratio F/PEO ranges from 0.04 to 0.1 and/or the ratio S/PEO ranges from 0.1 to 0.15.

As explained above, the material characteristics of the polymer electrolyte of the present invention makes it particularly useful as the electrolyte of choice in energy storage device, in particular in ZIBs. Some of these characteristics include ionic conductivity, yield strength, Young's modulus, glass transition temperature and melting point. The skilled person will understand that these characteristics may be achieved in particular if the ratio P/PEO and/or the ratio F/PEO and/or the ratio S/PEO is within the ranges defined above.

One the other hand, the skilled person will understand that it may be appropriate to define the polymer electrolyte of the present invention in terms of its material characteristics in order not to unduly limit the scope of the invention in terms of a specific relative composition. Therefore, according to another embodiment, the polymer electrolyte has one or more of the following characteristics: (a) an ionic conductivity of at least $10^{-6}$ S·cm$^{-1}$, preferably at least $10^{-4}$ S·cm$^{-1}$, and most preferably at least $0.5\times10^{-4}$ S·cm$^{-1}$, each measured at 25° C.; (b) a yield strength of at least 0.1 MPa, preferably at least 0.2 MPa, and most preferably at least 0.4 MPa; (c) a Young's modulus of at least 1.0 MPa, preferably at least 1.5 MPa, and most preferably at least 2.0 MPa; (d) a glass transition temperature of less than −40° C., preferably less than −42° C., and most preferably less than −45° C.; (e) a melting point of less than 65° C., preferably less than 60° C., more preferably less than 55° C., and most preferably less than 45° C.

In still another embodiment, the melting point of the polymer electrolyte is within a specific temperature range, such as 30° C. to 65° C., preferably 35° C. to 60° C., more preferably 38° C. to 55° C., and most preferably 40° C. to 45° C.

Polyethylene oxide grades that may be useful for the purpose of the present invention are solid at the temperatures commonly prevailing when operating energy storage devices. In one embodiment, the polyethylene oxide has a melting point of at least 50° C., more preferably at least 60° C., still more preferably at least 65° C., and most preferably at least 70° C. According to another embodiment, the polyethylene oxide is characterized by its molecular weight. In this embodiment, the polyethylene oxide has a molecular weight of from 50,000 to 10,000,000 g/mol, preferably from 100,000 to 7,000,000 g/mol, and most preferably from 300,000 to 5,000,000 g/mol.

It is generally possible that the matrix contains other polymers as well. However, in a preferred embodiment, the polymer electrolyte does not contain any polymers other than polyethylene oxide (PEO).

As explained above, another aspect of the present invention relates to an energy storage device comprising an anode, a cathode and the polymer electrolyte according to one or more of the embodiments disclosed hereinabove.

According to one embodiment, the anode is a zinc anode. Also, as explained above, still another aspect of the present invention relates to an energy storage device comprising a zinc anode, a cathode and a polymer electrolyte, characterized in that the polymer electrolyte comprises a polyethylene oxide matrix and a plasticizer additive comprising an ionic liquid.

The zinc anode can be prepared by electrodeposition, for example on carbon cloth. Thus, in one embodiment, the zinc anode is obtainable by plating zinc on a carbon substrate, preferably on carbon cloth. For this purpose, a zinc plate can be used as both counter and reference electrodes, and a piece of carbon (cloth) can be taken as the working electrode with an aqueous solution of zinc sulfate as the electrolyte. In a preferred embodiment, the zinc density on the substrate, for example on carbon cloth, ranges from 0.5 to 15 mg·cm$^{-2}$, preferably from 2 to 12 mg·cm$^{-2}$, and most preferably from 4 to 10 mg·cm$^{-2}$. In an exemplary embodiment, the anode substrate is carbon cloth, and the final zinc density is 5 to 8 mg·cm$^{-2}$.

According to an alternative embodiment, the zinc anode comprises zinc foil. Preferably, the zinc foil has a thickness ranging from 1 to 100 μm, more preferably from 5 to 50 μm, and most preferably from 25 to 80 μm. In an exemplary embodiment, the zinc foil has a thickness ranging from 30 to 50 μm.

The cathode usually comprises a metal species, also referred to as active material. Therefore, according to another embodiment, the cathode comprises an active material, preferably the active material comprises cationic manganese, and most preferably manganese dioxide or manganese hexacyanoferrate. Where manganese dioxide is used as the active material species, the α-form of manganese dioxide (α-MnO$_2$) may be preferred. According another preferred embodiment, the cathode material, e.g. the active material, is in the form of a powder.

The cathode may comprise other components, apart from the active material or active material powder. In one embodiment, the cathode further comprises carbon black, more preferably carbon black powder, and most preferably Ketjen black. The mass ratio of active material to carbon black may be within a specific range. In one embodiment, the mass ratio of active material to carbon black ranges from 1:1 to 10:1, preferably from 3:1 to 8:1, and most preferably from 2:1 to 5:1.

According to still another embodiment, the cathode further comprises electrically active particles and/or a binder. A particularly preferred binder is PVDF. Also here, the powder form is particularly useful. In one embodiment, powders of active material, carbon black and binder are present at a ratio of active material≥carbon black≥binder, preferably at a range of from 5:4:1 to 8:1:1, for example 7:2:1.

The cathode can be prepared by coating or painting the cathode material(s) on a substrate, for example on carbon cloth. Thus, in one embodiment, the cathode is obtainable by coating the active material (and optionally other components like carbon black, binder and/or electrically active particles) on carbon, preferably on carbon cloth. For the purpose of coating the cathode material(s) on the substrate, a suitable solvent may be used, such as N-methyl-2-pyrrolidone (NMP). In a preferred embodiment, the coating weight on the substrate, for example on carbon cloth, ranges from 0.1 to 10 mg·cm$^2$, preferably from 0.2 to 5 mg·cm$^2$, and most preferably from 0.5 to 2.5 mg·cm$^2$.

In another embodiment, the cathode further comprises a current collector, preferably the current collector comprises carbon cloth.

It is to be understood that, where appropriate, any of the embodiments described above in relation to the polymer electrolyte as such equally apply to the polymer electrolyte of the energy storage device of the present invention.

For example, in one embodiment of the energy storage device, the ionic liquid present in the polymer electrolyte of the energy storage device comprises a cation selected from Emim, Bmim and Hmim combined with an anion selected from OTF and TFSI, more preferably the ionic liquid is [Emim]OTF, [Bmim]OTF, [Hmim]OTF, [Emim]TFSI, [Bmim]TFSI or [Hmim]TFSI, still more preferably the ionic liquid is [Emim]OTF or [Emim]TFSI, and most preferably the ionic liquid is [Emim]OTF. Furthermore, according to another embodiment, the weight ratio of plasticizer additive to polyethylene oxide (P/PEO) ranges from 0.01 to 2, more preferably 0.05 to 1.5, and most preferably from 0.8 to 1.3.

The polymer electrolyte of the energy storage device may further comprise a solute and/or a filler as disclosed above.

For example, zinc oxide has been found to be a particularly useful filler. Therefore, in one embodiment of the energy storage device, the polymer electrolyte further comprises a filler, preferably a zinc oxide filler, and most preferably a zinc oxide nanofiller, i.e. the zinc oxide particles of the filler have a particle size in the nanometer range according to ISO/TS 27687:2008. According to another embodiment of the energy storage device, these filler particles may have a specific shape. For example, the filler comprises zinc oxide nanotubes, zinc oxide nanorods, zinc oxide nanowires, zinc oxide nanoplates and/or zinc oxide nanoparticles. In a particularly preferred embodiment, the filler comprises zinc oxide nanorods. In another embodiment, the weight ratio of filler to polyethylene oxide (F/PEO) ranges from 0.01 to 0.2, more preferably 0.02 to 0.15, and most preferably from 0.04 to 0.1.

The electrolyte of the energy storage device may further comprise a solute. In general, it is preferred that the solute is readily soluble in the polymer electrolyte matrix and the metal cation of the solute preferably corresponds to the metal of the anode. Therefore, readily soluble zinc salts are preferred. Also, it may be beneficial if the anion of the solute corresponds to that of the ionic liquid. Therefore, according to one embodiment, the solute is a zinc salt, more preferably the solute is zinc trifluoromethanesulfonate (=Zn(OTF)$_2$) or zinc bis(trifluoromethane)sulfonimide (=Zn(TFSI)$_2$).

In any of the foregoing embodiments of the energy storage device, the ratio P/PEO and/or the ratio F/PEO (if present) and/or the ratio S/PEO (if present) may be within the ranges defined above in relation to the polymer electrolyte as such. For example, most preferably, the ratio P/PEO ranges from 0.8 to 1.3 and/or the ratio F/PEO ranges from 0.04 to 0.1 (if present) and/or the ratio S/PEO ranges from 0.1 to 0.15 (if present).

According to another embodiment, the polymer electrolyte of the energy storage device has one or more of the following characteristics: (a) an ionic conductivity of at least $10^{-6}$ S·cm$^{-1}$, preferably at least $10^{-4}$ S·cm$^{-1}$, and most preferably at least $0.5 \times 10^{-4}$ S·cm$^{-1}$, each measured at 25° C.; (b) a yield strength of at least 0.1 MPa, preferably at least 0.2 MPa, and most preferably at least 0.4 MPa; (c) a Young's modulus of at least 1.0 MPa, preferably at least 1.5 MPa, and most preferably at least 2.0 MPa; (d) a glass transition temperature of less than −40° C., preferably less than −42° C., and most preferably less than −45° C.; (e) a melting point of less than 65° C., preferably less than 60° C., more preferably less than 55° C., and most preferably less than 45° C.

The polyethylene oxide grades useful for the electrolyte of the energy storage device are solid at the temperatures commonly prevailing when operating the device. In one embodiment, the polyethylene oxide has a melting point of at least 20° C., more preferably at least 25° C., still more preferably at least 35° C., and most preferably at least 50° C. According to another embodiment, the polyethylene oxide is characterized by its molecular weight. In this embodiment, the polyethylene oxide has a molecular weight of from 50,000 to 10,000,000 g/mol, preferably from 100,000 to 7,000,000 g/mol, and most preferably from 300,000 to 5,000,000 g/mol.

It is generally possible that the matrix contains other polymers as well. However, in a preferred embodiment of the energy storage device, the polymer electrolyte does not contain any polymers other than polyethylene oxide (PEO).

The present invention is further described in the following with reference to examples which, however, are not limiting the scope of the invention. Where appropriate, any measuring method referred to hereinafter shall apply to the embodiments of the invention described above.

EXAMPLES

Example 1: Preparation of α-MnO$_2$

α-MnO$_2$ was prepared from Solution A and Solution B. Solution A was prepared by dissolving 3 mmol MnSO$_4$·H$_2$O in 90 ml deionized water and adding 2 ml of 0.5 M H$_2$SO$_4$. Solution B was 20 ml 0.1 M KMnO$_4$ aqueous solution.

Then solution B was added into solution A dropwise and stirring was continued for 2 h at room temperature. The final formed mixture was then transferred to a Teflon-lined autoclave and heated at 120° C. for 12 h. After cooling, the obtained material was collected by centrifugation, washed three times with water, and dried using a vacuum oven at 40° C.

Example 2: Preparation of MnHCF

MnHCF nanoparticles were synthesized by a standard coprecipitation method. 100 ml of MnSG$_4$ (0.06 M) aqueous solution was added dropwise under stirring into 100 ml of $K_3Fe(CN)_6$ (0.03 M) solution. The resulting solution was kept stirring at 60° C. for 30 min. After standing for another 3 h, precipitates were separated via centrifugation and washed extensively with deionized water and ethanol several times. Brown solids were obtained after drying under vacuum at 60° C.

Example 3: Preparation of PEO Composite Electrolyte (Invention)

Each 0.9 g of PEO (4,000,000 g/mol) were mixed with optionally 0.05 g ZnO and 0.1 g optionally $Zn(OTF)_2$ in a mortar, and then different amounts of [Emim]OTF (0, 0.27, 0.54, 0.72 or 0.9 g) as the ionic liquid were mixed with these solids. Then, 10 ml of acetonitrile were added to dissolve the PEO polymer and further mixed in the mortar. This experiment was performed in a fume hood. After the mixture formed a gum, the gum was heated on a heating plate at 80° C. to keep the mixture at a soft state, then the soft gum was kneaded and ground several times to make the solids of ZnO disperse evenly. Finally, thin membrane films were produced by hot pressing at 50° C. The prepared samples are summarized in the following table (PEO=polyethylene oxide, IL=ionic liquid [Emim]OTF, ZnO=zinc oxide, S=Zn$(OTF)_2$ solute). Where appropriate, the weight ratio IL/PEO of ionic liquid to polyethylene oxide is indicated in parentheses as part of the sample name:

| Sample name | PEO (g) | ZnO (g) | [Emim]OTF (g) | $Zn(OTF)_2$ (g) |
|---|---|---|---|---|
| PEO/S | 0.9 | 0 | 0 | 0.1 |
| PEO/IL/S (1.0) | 0.9 | 0 | 0.9 | 0.1 |
| PEO/ZnO/S | 0.9 | 0.05 | 0 | 0.1 |
| PEO/ZnO/IL/S (0.3) | 0.9 | 0.05 | 0.27 | 0.1 |
| PEO/ZnO/IL/S (0.6) | 0.9 | 0.05 | 0.54 | 0.1 |
| PEO/ZnO/IL/S (0.8) | 0.9 | 0.05 | 0.72 | 0.1 |
| PEO/ZnO/IL/S (1.0) | 0.9 | 0.05 | 0.9 | 0.1 |

Example 4: Preparation of Conventional Hydrogel Electrolytes (Comparative)

(a) PVA Hydrogel 8 g of PVA (approx. 100,000 g/mol) were dissolved in distilled water (22.8 mL) at approx. 95° C. under vigorous stirring. The homogeneous solution was then cast into a mold of desired dimension and cooled at −15° C. for 1 h, followed by thawing at room temperature for 12 h. The freeze-thaw cycle was repeated another two times.

(b) PAA Hydrogel 7.2 ml acrylic acid (AA, Aladdin) were dissolved in 20 ml of deionized water and stirred for 20 min, then 60 mg of ammonium persulfate (APS) were added. After dissolution, 2 mg of N,N-methylenebisacrylamide (MBAA) were added. After magnetic stirring for another 30 min, the solution was sonicated for more than 30 min to remove bubbles. It was then transferred into a mold with designed thickness, and reacted at 65° C. for 1 h.

(c) PAM Hydrogel 3 g of acrylamide was dissolved in 20 ml deionized water, then 30 mg of APS and 2 mg of MBAA were sequentially added to the solution. After that, the mixture was stirred for 30 min. Thin polymer films were prepared by reacting the monomer solution in a mold with designed thickness and heating at 60° C. for 2 to 3 h.

Example 5: Preparation of Electrodes (a) Cathode

α-$MnO_2$ (or MnHCF) as described above was ground to a fine powder and then mixed with Ketjen black, and then mixed with PVDF (HSV 900) in a mortar with a mass ratio of 7:2:1. After that, N-methylpyrrolidone (NMP) was added as the solvent, and the mixture was further ground for another 30 min to form a uniform paste. The paste was blade-painted on carbon cloth with a density of 1.5 mg·$cm^2$.

(b) Zn Anode

The Zn anode was prepared by electrodeposition. A Zn plate was used as both counter and reference electrodes, and a piece of carbon cloth was taken as the working electrode with 1 M $ZnSO_4$ aqueous solution as the electrolyte. Zn deposited on the carbon cloth after a negative potential was applied (e.g., −0.6 V). Deposition was continued until a thin Zn layer covered the carbon cloth. The final Zn density is around 5 to 8 mg·$cm^{-2}$.

Example 6: Assembly of the Battery Device

The α-$MnO_2$ or MnHCF cathode, a PEO composite membrane (approx. 200 μm) and the Zn anode were assembled layer by layer, fixed between two glass plates with binder clips and placed in an oven at 40° C. for 3 h to promote the intimate contact between electrodes and electrolyte.

Measuring Methods

The glass transition temperature and melting temperature was measured on a DSC instrument (DSC25, HP Inc.) from −85° C. to 100° C. at a rate of 10° C./min.

The water content was estimated by using a simultaneous thermal analyser (PerkinElmer STA 6000), blowing with $N_2$ gas (50 ml·$min^{-1}$).

The stress-strain curves of hydrogels and polymer composite electrolytes were conducted on a Zwick Z030 tester (tensile rate=5 mm·$min^{-1}$).

The softness of the electrodes and electrolyte membrane was obtained by a leather softness tester (Okks).

The ionic conductivity of PEO electrolytes was measured with a piece of PEO membrane (1 or 2 $cm^2$, thickness approx. 400 μm) sandwiched between two stainless steel plates. The temperature dependent ionic conductivity was tested from higher temperature to lower temperature. Before each test, the sample was placed at that temperature for at least 30 min. After testing at the lowest temperature, the membrane was taken out and the thickness and surface area was measured. The conductivity of the hydrogels was calculated according to electrochemical impedance spectroscopy, which was measured on an electrochemical workstation (CHI7600E), with the frequency ranging from 100 kHz to 0.1 Hz. The intercept (R) of the curve on the X-axis was measured, and the conductivity was calculated according to the following equation: Conductivity=d/(SR), d and S are the thickness and the surface area of the electrolyte membrane, respectively.

Results (a) Ionic Conductivity

In case of PEO/ZnO/IL/S (1.0), the ionic conductivity of the PEO composite was 2.3×$10^{-3}$ S·$cm^{-1}$ at room temperature, and >0.01 S·$cm^{-1}$ when the temperature exceeded >50° C. Of note, the conductivity increased linearly with the temperature at first, then a slight upward change in slope was observed at temperatures ranging from 50 to 70° C. It is believed that this behaviour is related to a transition from a semicrystalline phase to a completely amorphous phase of [Emim]OTF-softened PEO which occurs at approx. 53° C.

(b) Mechanical Properties

The following is a comparison of the mechanical properties, including yield strength and Young's modulus determined from the strain-stress curves between the PEO based membrane and the conventional hydrogels:

| Sample name | Yield strength (MPa) | Young's Modulus (MPa) |
|---|---|---|
| PVA hydrogel | 0.014 | 0.018 |
| PAA hydrogel | 0.017 | 0.026 |
| PAM hydrogel | 0.012 | 0.34 |
| PEO/S | 0.17 | 4.5 |
| PEO/ZnO/S | 1.3 | 38 |
| PEO/ZnO/IL/S (0.3) | 0.90 | 7.4 |
| PEO/ZnO/IL/S (1.0) | 0.42 | 2.9 |

(c) Glass Transition Temperature and Melting Point

The effect of ionic liquid and ZnO on the glass transition temperature ($T_g$) and the melting temperature ($T_m$) of the electrolyte was measured by differential scanning calorimetry (DSC). $T_g$ of polymer PEO/IL (1.0) is −43.3° C. after addition of [Emim]OTF, which further negatively shifts to −45.3° C. in case of PEO/ZnO/IL (1.0) after ZnO was added. The slightly increased $T_g$ (−40.7° C.) after adding zinc salt can be explained by interactions between the oxygens of the PEO units and the zinc cations, which may increase the crosslinking degree.

The melting points of the PEO composite PEO/ZnO/IL/S (1.0) ($T_m$=39.9° C.), PEO/ZnO/IL (1.0) ($T_m$=49.7° C.) and PEO/IL (52.9° C.) are obviously smaller than that of pure PEO (without zinc salt) ($T_m$=65.9° C.). Therefore, it can be concluded that the addition of ionic liquid, such as [Emim] OTF, significantly results in a higher amorphous degree, while ZnO and Zn(OTF)$_2$ can further soften the PEO chains through intermingling and cross-linking, respectively.

(d) Other Characteristics

Dependency of the ionic resistance on the mass ratio [Emim]OTF/PEO (IL/PEO=0.3 and 1.0) was also investigated. Electrochemical impedance spectroscopy (EIS) showed that the addition of [Emim]OTF significantly reduces the resistance from over 4 kΩ for PEO/ZnO/S to 500Ω for PEO/ZnO/IL/S (0.3), and the further increasement of [Emim]OTF brings the resistance down to 20Ω for PEO/ZnO/IL/S (1.0). Resistance of PEO/S was approx. 5 kΩ.

When the samples were treated at relatively low temperature (from 30° C. to 40° C. at a rate of 1° C. min$^{-1}$, and kept at 40° C. for 2 hours, blowing of N$_2$ at 50 ml/min), PAM hydrogel shows the largest loss of 86.2% due to its large swelling ability of water, while PEO hydrogel shows a small water loss of 34.8%. By contrast, the PEO composite PEO/ZnO/IL/S (1.0) according to the invention exhibits a negligible loss of 3.3%.

The α-MnG$_2$ cathode as described above had a softness of 3.8 mm after painting on carbon cloth. The fabricated flexible zinc anode using electrochemical deposition possessed a softness of 1.2 mm. The PEO composite PEO/ZnO/IL/S (1.0) membrane of the present invention had a softness of 5.1 mm.

What is claimed is:

1. A polymer electrolyte comprising a polyethylene oxide matrix, a plasticizer additive, a solute, and a filler, characterized in that the plasticizer additive comprises an ionic liquid and the filler comprises zinc oxide; wherein the weight ratio of the plasticizer additive to the polyethylene oxide (P/PEO) ranges from 0.01 to 2, the weight ratio of the filler to the polyethylene oxide (F/PEO) ranges from 0.01 to 0.2, and the filler comprises zinc oxide nanotubes, zinc oxide nanorods, zinc oxide nanowires, zinc oxide nanoplates and/or zinc oxide nanoparticles.

2. The polymer electrolyte according to claim 1, wherein the cation of the ionic liquid is selected from the group consisting of imidazolium, vinylimidazolium, pyridinium, pyrrolidinium, guanidinium, piperidinium, morpholinium, ammonium, phosphonium and combinations thereof, and wherein the anion of the ionic liquid is independently selected from the group consisting of halogenides, perchlorate, tetra-fluoroborate, trifluoroacetate, hexafluorophosphate, phosphinates, tosylate, triflate, bis(trifluoromethanesulfonyl)amide, bis(fluorosulfonyl)imide, bis(trifluoromethane)sulfonimide (TFSI), dicyanamide, tris(pentafluoroethyl)trifluorophosphate, dimethylsulfate, difluoro(oxalato)borate (DFOB), Bis(oxalate)borate (BOB), trifluoromethanesulfonate (OTF) and combinations thereof.

3. The polymer electrolyte according to claim 1, wherein the ionic liquid comprises a pyrrolidinium cation or an imidazolium cation selected from the group consisting of 1-ethyl-3-methylimidazolium (Emim), 1-butyl-3-methylimidazolium (Bmim), 1-hexyl-3-methylimidazolium (Hmim) and combinations thereof.

4. The polymer electrolyte according to claim 1, wherein the ionic liquid comprises an anion selected from trifluoromethanesulfonate (OTF) or bis(trifluoromethane)sulfonimide (TFSI).

5. The polymer electrolyte according to claim 1, wherein the solute is a zinc salt comprising zinc trifluoro-methanesulfonate or zinc bis(trifluoromethane)sulfonimide.

6. The polymer electrolyte according to claim 5, wherein the weight ratio of solute to polyethylene oxide (S/PEO) ranges from 0.05 to 0.4.

7. The polymer electrolyte according to claim 1, wherein the ionic liquid is selected from the group consisting of 1-ethyl-3-methylimidazolium trifluoromethanesulfonate ([Emim]OTF) or 1-ethyl-3-methylimidazolium bis(trifluoromethane)sulfonimide ([Emim]TFSI), wherein the filler comprises zinc oxide nanorods, and wherein the polymer electrolyte further comprises zinc trifluoromethanesulfonate or zinc bis(trifluoromethane)sulfonimide as a solute.

8. The polymer electrolyte according to claim 1, which has one or more of the following characteristics:
   (a) an ionic conductivity of at least $10^{-6}$ S·cm$^{-1}$ measured at 25° C.;
   (b) a yield strength of at least 0.1 MPa;
   (c) a Young's modulus of at least 1.0 MPa;
   (d) a glass transition temperature of less than −40° C.;
   (e) a melting point of less than 65° C.

9. The polymer electrolyte according to claim 1, wherein the polyethylene oxide has a molecular weight of from 50,000 to 10,000,000 g/mol.

10. An energy storage device comprising an anode, a cathode and the polymer electrolyte according to claim 1.

11. The energy storage device according to claim 10, wherein the anode is a zinc anode.

12. An energy storage device comprising a zinc anode, a cathode and a polymer electrolyte, characterized in that the polymer electrolyte comprises a polyethylene oxide matrix, a filler and a plasticizer additive comprising an ionic liquid; wherein the weight ratio of the plasticizer additive to the polyethylene oxide (P/PEO) ranges from 0.01 to 2, the weight ratio of the filler to the polyethylene oxide (F/PEO) ranges from 0.01 to 0.2, and the filler comprises zinc oxide nanotubes, zinc oxide nanorods, zinc oxide nanowires, zinc oxide nanoplates and/or zinc oxide nanoparticles.

13. The energy storage device according to claim 11, wherein the zinc anode comprises zinc foil.

14. The energy storage device according to claim 10, wherein the cathode comprises an active material, wherein the active material comprises cationic manganese comprising manganese dioxide or manganese hexacyanoferrate.

15. The energy storage device according to claim 10, wherein the cathode comprises a current collector, wherein the current collector comprises carbon cloth.

16. The energy storage device according to claim 10, wherein the cathode further comprises electrically active particles and/or a binder.

17. The energy storage device according to claim 12, wherein the zinc anode comprises zinc foil.

18. The energy storage device according to claim 12, wherein the cathode comprises an active material, wherein the active material comprises cationic manganese comprising manganese dioxide or manganese hexacyanoferrate.

19. The energy storage device according to claim 12, wherein the cathode comprises a current collector, wherein the current collector comprises carbon cloth.

20. The energy storage device according to claim 12, wherein the cathode further comprises electrically active particles and/or a binder.

* * * * *